US010630807B2

(12) United States Patent
Mao et al.

(10) Patent No.: US 10,630,807 B2
(45) Date of Patent: Apr. 21, 2020

(54) METHOD AND SYSTEM FOR LOADING APPLICATION- SPECIFIC INTERFACES IN A SOCIAL NETWORKING APPLICATION

(71) Applicant: TENCENT TECHNOLOGY (SHENZHEN) COMPANY LIMITED, Shenzhen, Guangdong (CN)

(72) Inventors: Wei Mao, Shenzhen (CN); Yuewei Chen, Shenzhen (CN); Xing Liang, Shenzhen (CN); Qiang Lu, Shenzhen (CN); Deyuan Li, Shenzhen (CN); Zhonghua Lai, Shenzhen (CN); Zhenyu Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 332 days.

(21) Appl. No.: 15/190,907

(22) Filed: Jun. 23, 2016

(65) Prior Publication Data

US 2016/0309000 A1 Oct. 20, 2016

Related U.S. Application Data

(63) Continuation of application No. PCT/CN2015/070502, filed on Jan. 12, 2015.

(30) Foreign Application Priority Data

May 29, 2014 (CN) .......................... 2014 1 0234115

(51) Int. Cl.
*G06F 15/16* (2006.01)
*H04L 29/08* (2006.01)
(Continued)

(52) U.S. Cl.
CPC .......... *H04L 67/327* (2013.01); *G06Q 50/01* (2013.01); *H04L 51/04* (2013.01); *H04L 51/32* (2013.01);
(Continued)

(58) Field of Classification Search
CPC .............................. H04L 67/327; G06Q 50/01
(Continued)

(56) References Cited

U.S. PATENT DOCUMENTS

| 8,005,930 B2 | 8/2011 | Abeln | |
|---|---|---|---|
| 2010/0057872 A1* | 3/2010 | Koons | G06Q 30/02 709/206 |

(Continued)

FOREIGN PATENT DOCUMENTS

| CN | 101051372 A | 10/2007 |
|---|---|---|
| CN | 101183949 A | 5/2008 |

(Continued)

OTHER PUBLICATIONS

International Search Report in international application No. PCT/CN2015/070502, dated Mar. 31, 2015.

(Continued)

*Primary Examiner* — Dustin Nguyen
*Assistant Examiner* — Joel Mesa
(74) *Attorney, Agent, or Firm* — Sughrue Mion, PLLC

(57) ABSTRACT

A mobile device supports loading application-specific interfaces associated with the third-party application into a social networking application. The mobile device sends a third-party application identifier to a remote server, which returns a verification result. If positive, the mobile device activates the third-party application to generate an application-specific interface and loads the interface into the social networking application. After detecting a user request initiated through the interface, the mobile device sends the user (Continued)

request to the remote server, which performs a transaction with a third-party server accordingly and returns a response to the mobile device. In response, the mobile device deactivates the third-party application and replaces the application-specific interface with a display of an instant message corresponding to the response in the social networking application. If negative, the mobile device displays an instant message corresponding to the negative verification result in the social networking application.

20 Claims, 7 Drawing Sheets

(51) Int. Cl.
G06Q 50/00 (2012.01)
H04L 12/58 (2006.01)
H04M 1/725 (2006.01)

(52) U.S. Cl.
CPC ......... *H04L 67/36* (2013.01); *H04M 1/72522* (2013.01)

(58) Field of Classification Search
USPC .......................................................... 709/226
See application file for complete search history.

(56) References Cited

U.S. PATENT DOCUMENTS

| | | | | |
|---|---|---|---|---|
| 2010/0262924 | A1* | 10/2010 | Kalu | H04L 51/04 |
| | | | | 715/753 |
| 2013/0043302 | A1* | 2/2013 | Powlen | G06F 16/381 |
| | | | | 235/375 |
| 2013/0080420 | A1 | 3/2013 | Taylor | |
| 2013/0247031 | A1 | 9/2013 | He | |
| 2014/0156481 | A1* | 6/2014 | Gilveli | G06Q 30/0631 |
| | | | | 705/35 |
| 2014/0195395 | A1* | 7/2014 | Bhakta | G06Q 40/00 |
| | | | | 705/35 |
| 2014/0359018 | A1* | 12/2014 | Sun | G06Q 50/01 |
| | | | | 709/204 |
| 2015/0200948 | A1* | 7/2015 | Cairns | G06F 21/44 |
| | | | | 726/4 |

FOREIGN PATENT DOCUMENTS

| | | |
|---|---|---|
| CN | 102137144 A | 7/2011 |
| CN | 102411585 A | 4/2012 |
| CN | 102542691 A | 7/2012 |
| CN | 102866905 A | 1/2013 |
| CN | 102929672 A | 2/2013 |
| CN | 103365844 A | 10/2013 |
| CN | 103748583 A | 4/2014 |
| CN | 103782294 A | 5/2014 |
| CN | 104144206 A | 11/2014 |

OTHER PUBLICATIONS

English Translation of the Written Opinion of the International Search Authority in international application No. PCT/CN2015/070502, dated Mar. 31, 2015.

Notification of the First Office Action of Chinese application No. 201410234115.7, dated Nov. 2, 2015.

Notification of the Third Office Action of Chinese application No. 201410234115.7, dated May 9, 2016.

* cited by examiner

METHOD AND SYSTEM FOR LOADING APPLICATION- SPECIFIC INTERFACES IN A SOCIAL NETWORKING APPLICATION

CROSS REFERENCE TO RELATED APPLICATION

This is a continuation application of International Patent Application No. PCT/CN2015/070502, filed on Jan. 12, 2015, which claims priority to Chinese Patent Application No. 201410234115.7, filed on May 29, 2014, the disclosures of which are incorporated by reference in their entirety.

TECHNICAL FIELD

The present application relates to the Internet field, and in particular, to method and system for loading application-specific interfaces into a social networking application.

BACKGROUND

During conventional resource exchanges, after a user selects a resource and gives an exchange instruction on a web page, the user is redirected to an exchange response interface (exchange response page) of the resource in a web page redirection manner, so that the user completes the exchange. However, this manner has problems in an actual application. For example, because the web page redirection manner is used, the speed for loading an interface is low.

SUMMARY

The above deficiencies and other problems associated with the conventional approach of performing a resource exchange on a mobile device are reduced or eliminated by the invention disclosed below. In some embodiments, the present application is implemented in a mobile device that has one or more processors, memory and one or more modules, programs or sets of instructions stored in the memory for performing multiple functions. Instructions for performing these functions may be included in a computer program product configured for execution by one or more processors and stored in a non-transitory computer readable medium.

One aspect of the present application involves a computer-implemented method performed by a mobile device having one or more processors and memory and a display. While running the social networking application, the mobile device detects an identifier associated with the third-party application and sends the third-party application identifier to a remote server. The remote server is configured to verify the third-party application identifier and return a verification result to the mobile device. In response to a positive verification result from the remote server, the mobile device activates the third-party application to generate an application-specific interface in accordance with the positive verification result and loads the interface into the social networking application. After detecting a user request initiated through the application-specific interface loaded into the social networking application, the mobile device sends the user request to the remote server. The remote server is configured to perform a transaction with a third-party server in accordance with the user request and return a response to the mobile device. Upon receipt of the response, the mobile device deactivates the third-party application and replaces the application-specific interface with a display of an instant message corresponding to the response in the social networking application.

Another aspect of the present application involves a mobile device including memory, one or more processors, and one or more program modules stored in the memory and configured for execution by the one or more processors to perform the method described above.

Yet another aspect of the present application involves a non-transitory computer readable storage medium having stored therein one or more programs for execution by one or more processors of a mobile device. The one or more programs include instructions, when executed by the one or more processors, cause the processors to perform the operations as described above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the technical solutions of the present application more comprehensible, the solutions of the present application are described in further detail below with reference to accompanying drawings and embodiments.

Figure 1:
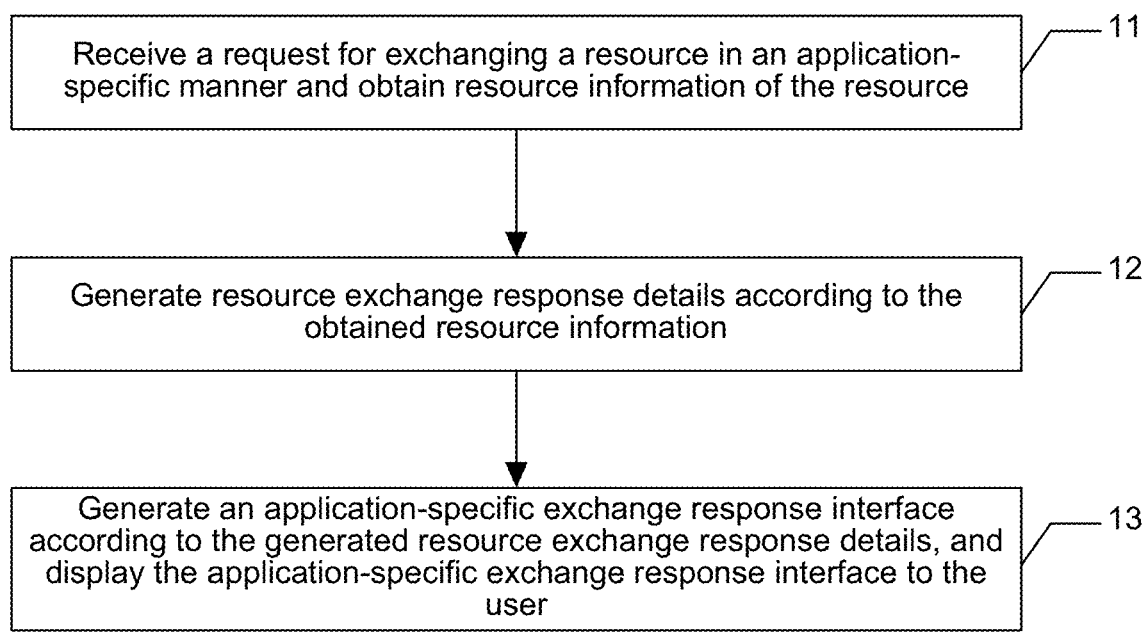
FIG. 1 is a flowchart of an embodiment of an interface loading method according to some embodiments of the present application.

FIG. 1 is a flowchart of an embodiment of an interface loading method according to some embodiments of the present application. As shown in FIG. 1, the method includes the following steps 11 to 13.

Step 11: Receive a request for exchanging a resource in an application-specific manner from a user and obtain resource information of the resource.

In this step, if it is monitored that the user performs a preset operation on a certain resource, and a link corresponding to the resource is a link defined according to an application-specific standard, resource information of the resource can be obtained.

The preset operation includes, but is not limited to, one of the following operations: scanning a static two-dimensional code corresponding to the resource; clicking a link corresponding to the resource; and clicking an image-text message corresponding to the resource.

A static two-dimensional code is a two-dimensional code with fixed content and can be scanned by everyone.

A link corresponding to a resource exchanged in the application-specific manner is required to be a link defined according to an application-specific standard. A specific expression manner of the standard may be set according to an actual need, for example, each link defined according to the application-specific standard needs to use the following structure: a preset prefix plus a series of key-value pairs for distinguishing the resource.

The link refers to a uniform resource locator (URL).

For a resource exchanged in the application-specific manner, a link, a static two-dimensional code, or an image-text message that corresponds to the resource may be displayed to the user. Methods for creating the static two-dimensional code and the image-text message belong to the prior art. In this way, once it is monitored that the user scans the static two-dimensional code corresponding to the resource, clicks the link corresponding to the resource, or clicks the image-text message corresponding to the resource, resource information of the resource can be obtained.

The resource information may include information of a provider of the resource, information of the resource, and the like. The information may be included in the link, the static two-dimensional code, and the image-text message that correspond to the resource.

The static two-dimensional code is used as an example. As described above, the static two-dimensional code is a two-dimensional code with fixed content; in other words, compared with a dynamic two-dimensional code, content in the static two-dimensional code is not updated dynamically. In this way, for any resource, if anyone wants to exchange the resource, a static two-dimensional code corresponding to the resource may be scanned, and correspondingly, resource information of the resource can be obtained through scanning.

Step 12: Generate resource exchange response details according to the obtained resource information.

In this step, information needed for generating the resource exchange response details corresponding to the resource information may be obtained from a resource platform corresponding to the resource in a getpackage manner, and then the resource exchange response details are generated according to the obtained information needed for generating the resource exchange response details.

Content specifically included in the information needed for generating the resource exchange response details may be set according to an actual need, for example, an effective time, an exchange manner, and the like of the current exchange may be included.

Both the specific implementation manner of the getpackage and the manner of generating the resource exchange response details belong to the prior art.

In addition, for each resource, a callback address, namely, a callback URL, of a resource platform corresponding to the resource may be obtained in advance, so that information needed for generating resource exchange response details can be obtained subsequently according to the callback address. In other words, the information needed for generating the resource exchange response details of the resource may be obtained from the resource platform based on the callback address, which is obtained in advance, of the resource platform corresponding to the resource to be exchanged by the user.

Based on the foregoing introduction, a specific implementation manner of this step may include: sending a request for obtaining the information needed for generating the resource exchange response details to the resource platform corresponding to the resource, where the request carries the obtained resource information, signature information of itself, and the like; verifying, by the resource platform, the received signature information, and if the verification is passed, returning the information needed for generating the resource exchange response details corresponding to the resource information, and signature information of the resource platform; and verifying the received signature information of the resource platform, and if the verification is passed, generating the resource exchange response details according to the received information needed for generating the resource exchange response details.

Manners in which the two communication parties generate signature information of themselves and verify signature information with each other are not limited as long as the two parties negotiate with each other in advance and perform operations in a negotiated manner. In this manner, the two communication parties may verify with each other whether the identity of the other party is legal, so as to ensure security of the current resource exchange.

Step 13: Generate an application-specific exchange response interface according to the generated resource exchange response details, and display the application-specific exchange response interface to the user.

In this step, the application-specific exchange response interface may be further generated according to the resource exchange response details generated in step 12, and the application-specific exchange response interface is displayed to the user.

The application-specific exchange response interface refers to an application-specific interface in which the resource exchange response details are displayed, and specific content included in the resource exchange response details may be set according to an actual need.

The application-specific interface refers to a non-webView interface. Compared with a webView interface, the application-specific interface is obviously advantageous in terms of the loading speed, and can display information to a user more quickly.

A specific manner of displaying the resource exchange response details on the application-specific interface may be: a window popping up, where the resource exchange response details are displayed on the window, or pushing an interface, for example, pushing an interface from the right to the left, where the resource exchange response details are displayed on the interface. Definitely, the foregoing is only an example for description and is not intended to limit the technical solutions of the present application. Generally speaking, any non-web page display manner is acceptable.

In an actual application, the exchanging a resource in the application-specific manner in the solution of the present application may refer to buying a commodity in an application-specific payment manner, or the like. It can be known from the foregoing introduction that application-specific payment refers to redirection to an application-specific interface of a mobile device by scanning a static two-dimensional code corresponding to the commodity, clicking a corresponding link, or clicking a corresponding image-text message on the mobile device, to display order information, so as to achieve faster and more efficient payment.

Correspondingly, the resource information obtained in step 11 may include seller information of the commodity and information of the commodity. In step 12, the seller information, the information of the commodity, and buyer information may be sent together with the signature information to the resource platform, namely a seller platform of the commodity, so that the seller platform learns about specifics about this transaction in time.

In an actual application, the process shown in FIG. 1 is generally completed by a mobile device and a server in cooperation. A cooperation manner of the mobile device and the server is further described below by using a preferred embodiment.

Figure 2:
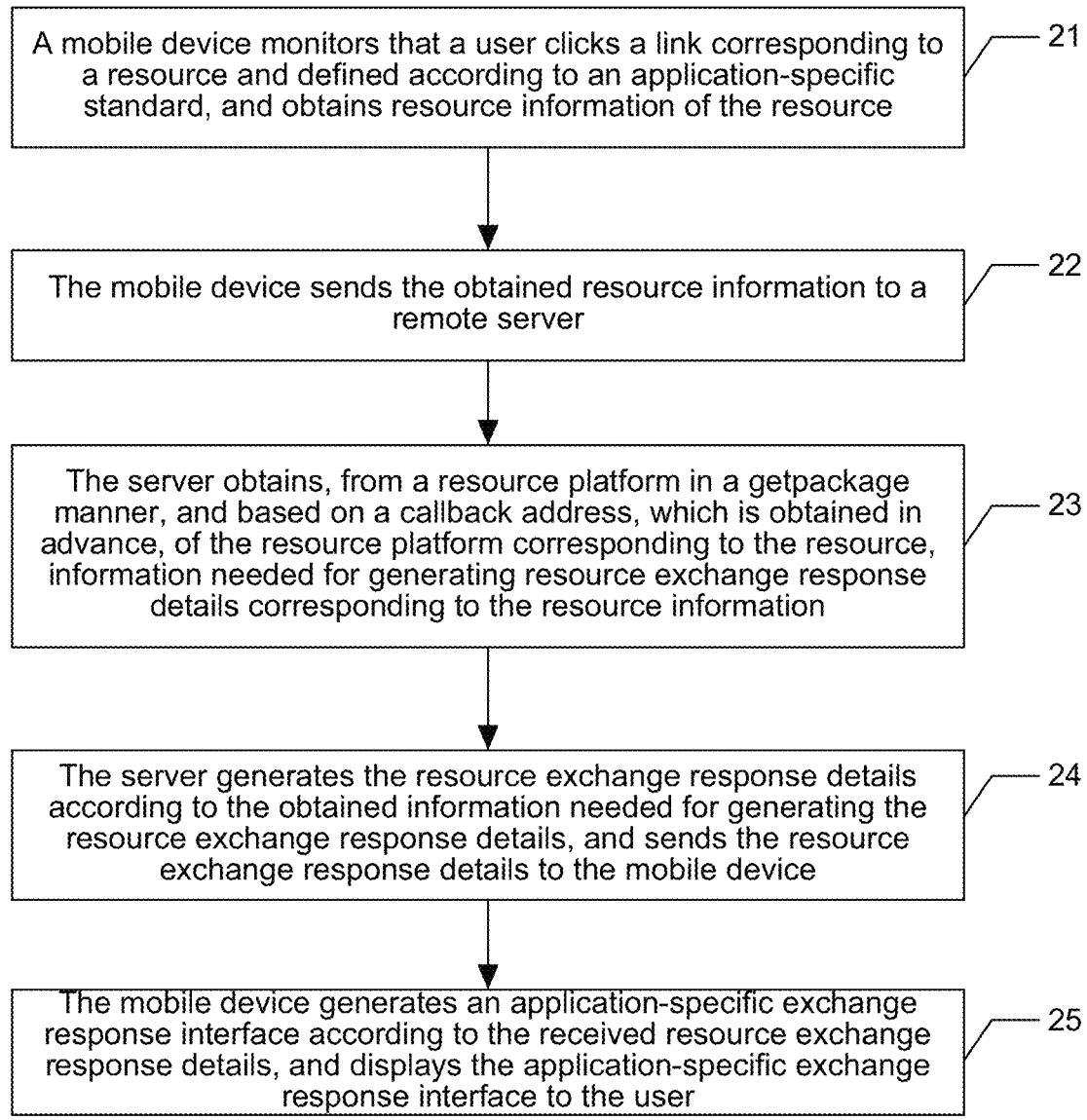
FIG. 2 is a flowchart of a preferred embodiment of an interface loading method according to some embodiments of the present application.

FIG. 2 is a flowchart of a preferred embodiment of an interface loading method according to some embodiments of the present application. As shown in FIG. 2, the method includes the following steps 21 to 25.

Step 21: A mobile device monitors that a user clicks a link corresponding to a resource and defined according to an application-specific standard, and obtains resource information of the resource.

Step 22: The mobile device sends the obtained resource information to a remote server.

Step 23: The server obtains, from a resource platform (e.g., a server supporting a third-party application) in a getpackage manner, and based on a callback address, which is obtained in advance, of the resource platform corresponding to the resource, information needed for generating resource exchange response details corresponding to the resource information.

Step 24: The server generates the resource exchange response details according to the obtained information needed for generating the resource exchange response details, and sends the resource exchange response details to the mobile device.

Step 25: The mobile device generates an application-specific exchange response interface according to the received resource exchange response details, and displays the application-specific exchange response interface to the user.

It can be seen that, in the method embodiments of the present application, when a user exchanges a resource, an application-specific exchange response interface may be used to display resource exchange response details of the current exchange, namely, an application-specific exchange response interface is generated and displayed to the user. The present application is different from the prior art in which an exchange response interface is displayed to the user in a web page redirection manner, and therefore improves a speed for loading the exchange response interface.

In addition, the user can exchange a resource not only through an online click operation but also by scanning a static two-dimensional code offline, namely, the exchange can be completed without resorting to a network but only using a static two-dimensional code printed on a paper, which is very easy and convenient to implement, is applicable to various different scenarios, and has wide applicability.

Figure 3:
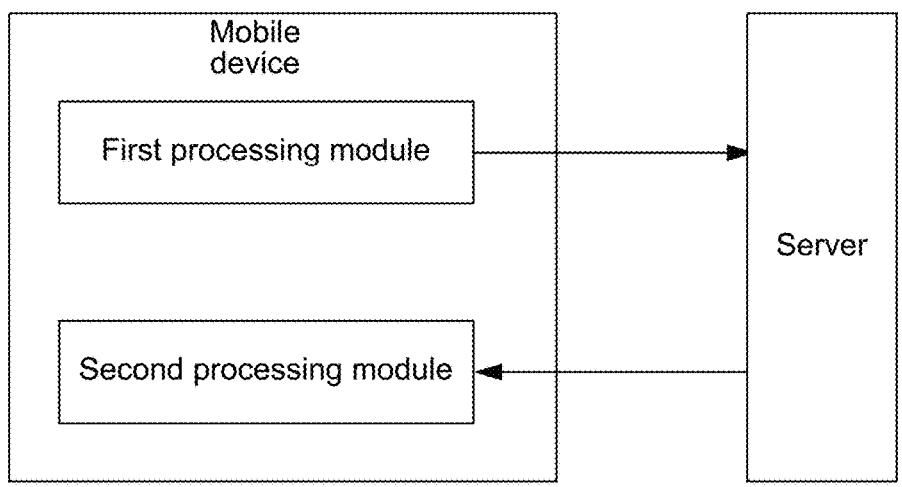
FIG. 3 is a schematic structural diagram of composition of an embodiment of an interface loading system according to some embodiments of the present application.

Based on the foregoing introduction, FIG. 3 is a schematic structural diagram of composition of an embodiment of an interface loading system according to some embodiments of the present application. As shown in FIG. 3, the system includes a mobile device and a server.

The mobile device is configured to receive a request for exchanging a resource in an application-specific manner from a user, obtain resource information of the resource, send the resource information to the server, generate an application-specific exchange response interface according to resource exchange response details received from the server, and display the application-specific exchange response interface to the user.

The server is configured to generate the resource exchange response details according to the resource information, and send the resource exchange response details to the mobile device.

If the mobile device monitors that the user performs a preset operation on the resource, and a link corresponding to the resource is a link defined according to an application-specific standard, resource information of the source can be obtained.

The preset operation includes one of the following operations: scanning a static two-dimensional code corresponding to the resource; clicking a link corresponding to the resource; and clicking an image-text message corresponding to the resource.

In addition, the server may be further configured to: obtain, in a getpackage manner from a resource platform corresponding to the resource, information needed for generating the resource exchange response details corresponding to the resource information, and generate the resource exchange response details according to the information needed for generating the resource exchange response details.

The server may obtain, from the resource platform and based on a callback address, which is obtained in advance, of the resource platform, the information needed for generating the resource exchange response details.

The server sends a request for obtaining the information needed for generating the resource exchange response details to the resource platform, where the request carries the resource information and signature information of the server.

The resource platform verifies the received signature information, and if the verification is passed, returns, to the server, the information needed for generating the resource exchange response details corresponding to the resource information, and signature information of the resource platform.

The server verifies the received signature information, and if the verification is passed, generates the resource exchange response details according to the received information needed for generating the resource exchange response details.

As shown in FIG. 3, the mobile device may further specifically include a first processing module and a second processing module.

The first processing module is configured to receive a request for exchanging a resource in an application-specific manner from a user, obtain resource information of the resource, and send the resource information to the server.

The second processing module is configured to generate an application-specific exchange response interface according to resource exchange response details received from the server, and display the application-specific exchange response interface to the user.

If the first processing module monitors that the user performs a preset operation on the resource, and a link corresponding to the resource is a link defined according to an application-specific standard, the first processing module can obtain resource information of the source.

The preset operation includes one of the following operations: scanning a static two-dimensional code corresponding to the resource; clicking a link corresponding to the resource; and clicking an image-text message corresponding to the resource.

Figure 4:
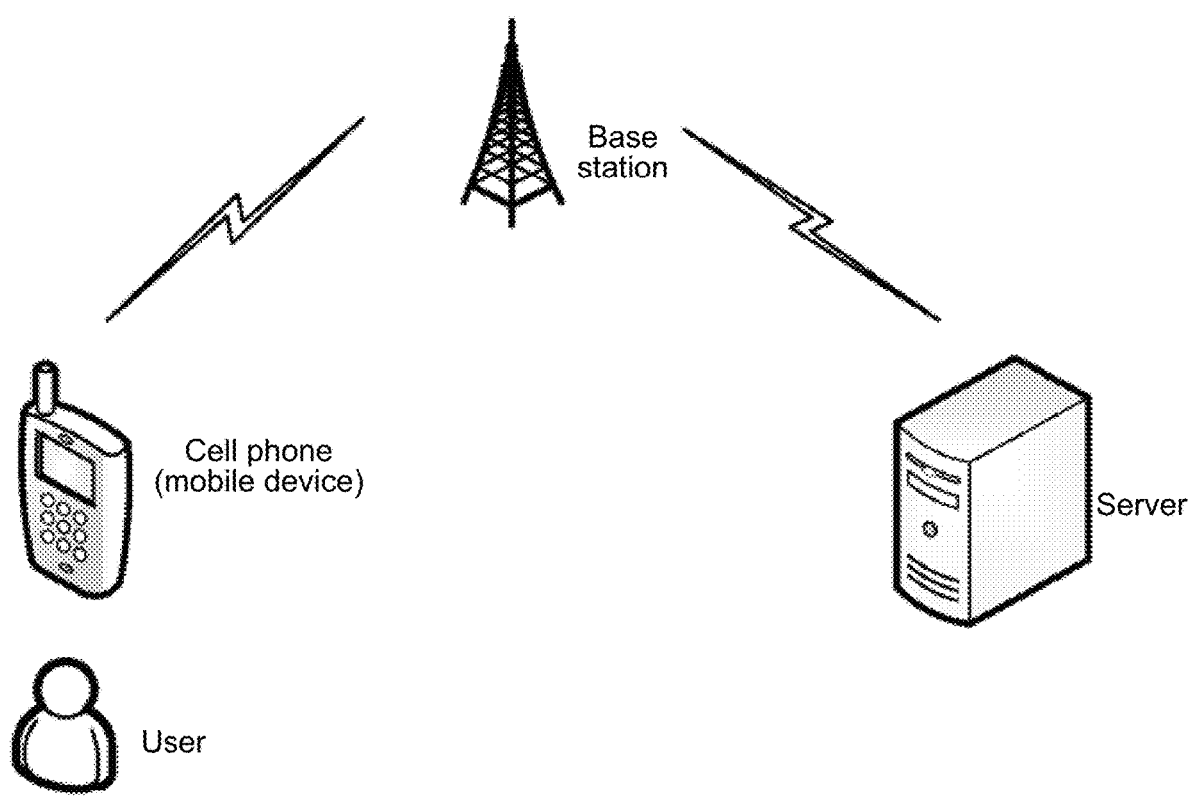
FIG. 4 is a schematic diagram of a hardware environment for implementing the system embodiment shown in FIG. 3.

In an actual application, the mobile device shown in FIG. 3 may be an intelligent terminal, a personal computer, or the like. FIG. 4 is a schematic diagram of a hardware environment for implementing the system embodiment shown in FIG. 3. As shown in FIG. 4, assuming that the mobile device is a cell phone, the user is a user of the cell phone. The cell phone may perform information interaction with the server by resorting to a base station. Refer to related description in the foregoing preferred method embodiment for a specific interaction process, which is not described again herein.

It can be seen that in the system embodiment of the present application, when a user exchanges a resource, an application-specific exchange response interface may be used to display resource exchange response details of the current exchange, namely, an application-specific exchange response interface is generated and displayed to the user. The present application is different from the prior art in which an exchange response interface is displayed to the user in a web page redirection manner, and therefore improves a speed for loading the exchange response interface.

In addition, the user can exchange a resource not only through an online click operation but also by scanning a static two-dimensional code offline, namely, the exchange can be completed without resorting to a network but only using a static two-dimensional code printed on a paper, which is easy and convenient to implement, is applicable to different scenarios, and has wide applicability.

Figure 5:
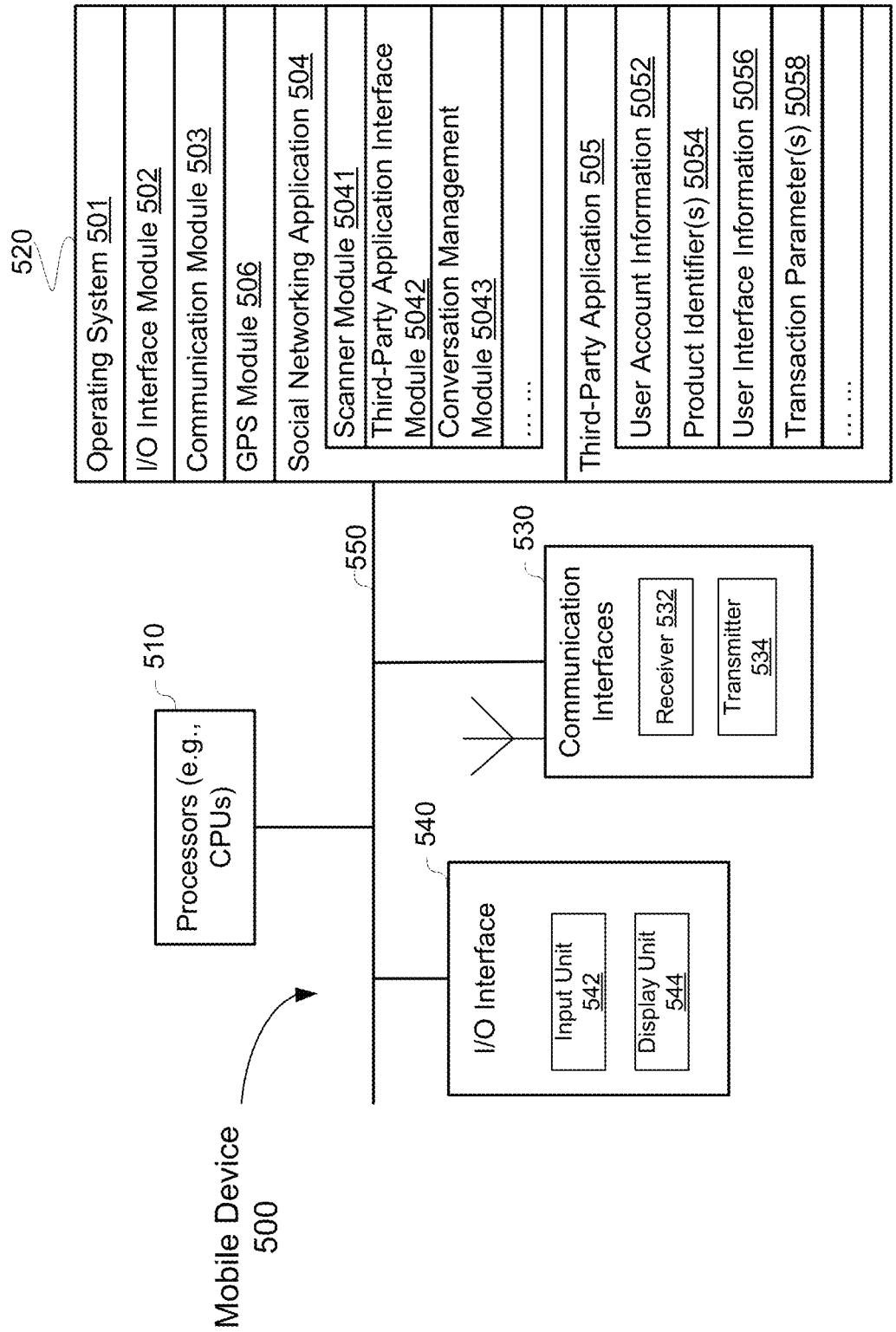
FIG. 5 is a block diagram of components of an exemplary mobile device according to some embodiments of the present application.

FIG. 5 is a block diagram of components of an exemplary mobile device 500 according to some embodiments of the present application. In some implementations, the mobile device 500 at least includes one or more processors 510 (e.g., central processing units) and memory 520 for storing data, programs and instructions for execution by one or more processors 510. In some implementations, the mobile device 500 further includes one or more communication interfaces 530, an input/output (I/O) interface 540, and one or more communication buses 550 that interconnect these components.

In some embodiments, the I/O interface 540 includes an input unit 542 and a display unit 544. Examples of the input unit 542 include a keyboard, a mouse, a touch pad, a game controller, a function key, a trackball, a joystick, a microphone, a camera and the like. Additionally, the display unit 544 displays information that is inputted by the user or provided to the user for review. Examples of display unit 844 include, but are not limited to, a liquid crystal display (LCD) and an organic light-emitting diode (OLED) display. In some implementations, the input unit 542 and the display unit 544 are integrated on a touch-sensitive display that displays a graphical user interface (GUI).

In some embodiments, the communication interfaces 530 include circuitry (sometimes called a chipset) that interconnects and controls communications between system components. In some embodiments, the communication interfaces 530 further include a receiver 532 and a transmitter 534 so as to, e.g., communicate with a nearby base station as shown in FIG. 4.

In some embodiments, the memory 520 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 520 includes one or more storage devices remotely located from the one or more processors 510. In some embodiments, memory 520, or alternatively the non-volatile memory device(s) within memory 520, includes a non-transitory computer readable storage medium.

In some embodiments, the memory 520 or alternatively the non-transitory computer readable storage medium of memory 520 stores the following programs, modules and data structures, instructions, or a subset thereof:

- Operating system 501 that includes procedures for handling various basic system services and for performing hardware dependent tasks;
- I/O interface module 502 that includes procedures for handling various basic input and output functions through one or more input and output devices, wherein the I/O interface module 502 further includes an interface display module that controls displaying of a graphical user interface;
- Communication module 503 that is used for connecting the mobile device 500 to other computational devices (e.g., servers and client devices), via one or more network communication interfaces 530 (wired or wireless) and one or more communication networks, such as the Internet, other wide area networks, local area networks, metropolitan area networks, and so on;
- GPS module 506 that keeps track of the current location of the mobile device 500 and provides such information to other applications in the memory 520;
- Social networking application 504 that includes at least a scanner module 5041 for scanning, e.g., a QR code associated with a product, a third-party application interface module 5042 for interacting with a third-party application, e.g., loading the interface of the third-party application into the social networking application 504, and a conversation management module 5043 for managing conversations between the user of the mobile device 500 and other entities; and
- Third-party application 505 for interacting with a third-party server and performing related operations, the third-party application 505 storing user account information 5052 associated with a registered user of the third-party application 505, one or more product identifiers 5054, application-specific user interface information 5056 for interacting with the social networking application 504, and a plurality of transaction parameters 5058.

More details on the functions of the social networking application 504 and the third-party application 505 are explained below with reference to FIGS. 6 and 7A-7E. In particular, FIG. 6 is a flowchart of loading application-specific interfaces into a social networking application in connection with a resource exchange according to some embodiments of the present application; and FIGS. 7A-7E are exemplary screenshots of a mobile device in connection with a resource exchange according to some embodiments of the present application.

Figure 7C:
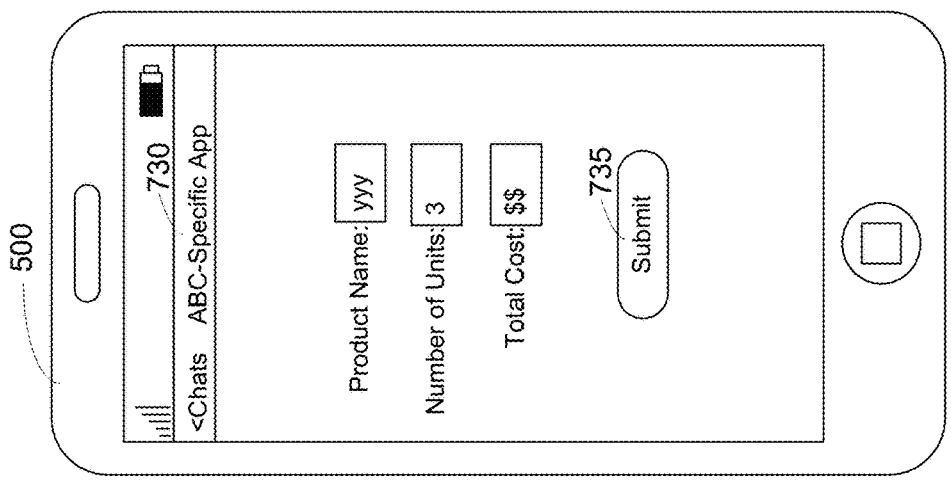
FIGS. 7A-7E are exemplary screenshots of a mobile device in connection with a resource exchange according to some embodiments of the present application.
Figure 7B:
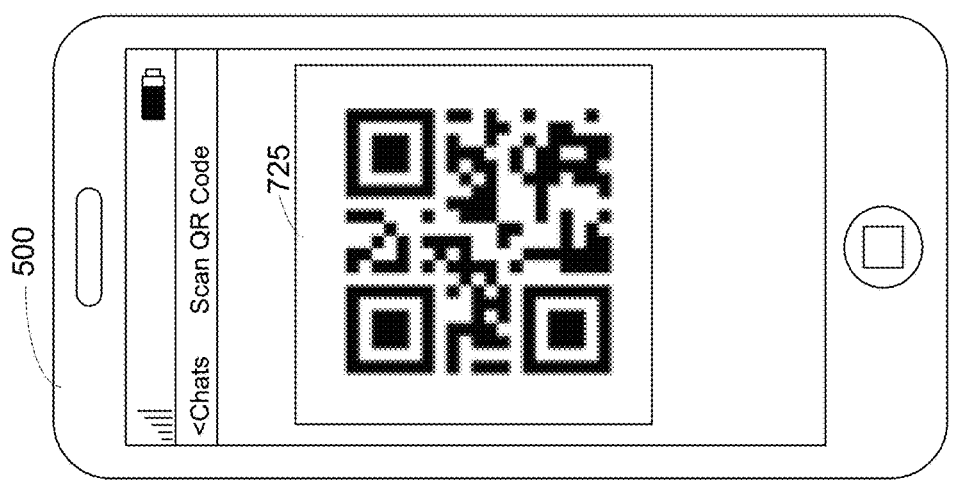
Figure 7A:
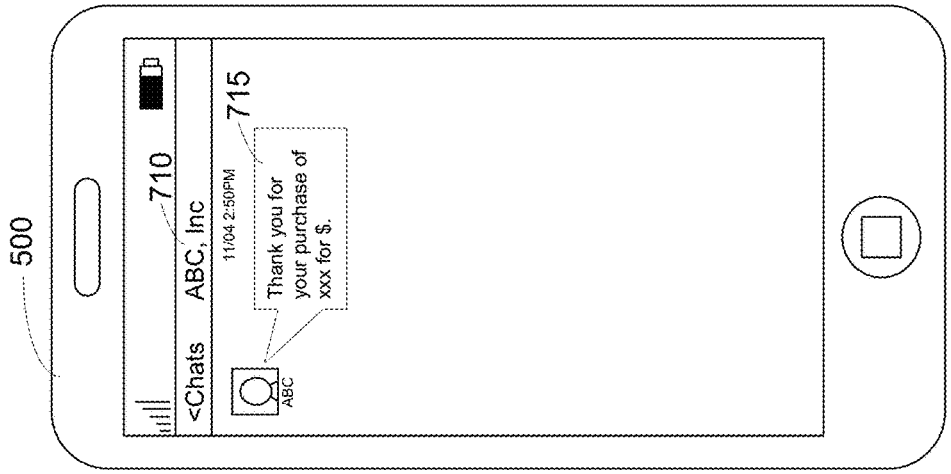

As shown in FIG. 5, the mobile device 500 (e.g., a smartphone) includes multiple applications designed for different purposes. The social networking application 504 is for the user of the mobile device 500 to communicate with other entities through a remote server (see, e.g., FIG. 4). Note that the other entities include individual users of the social networking application or a third-party application (e.g., a service provider) that registers as a user of the social networking application. For example, the third-party service provider is an entity managing newsstands for distributing newspapers and magazines. As shown in FIG. 7A, the social networking application 504 includes a conversation between the user of the mobile device 500 and the third-party service provider "ABC, Inc." 710. In this example, the conversation keeps track of past communication records 715 between the two parties so that the user of the mobile device 500 can easily verify a purchase made at a particular newsstand. Instead of instructing purchasers to pay for the publications by depositing coins through a slot of a newsstand, there may be a label of a QR code attached to the newsstand. A user can scan the QR code using the scanner module 5041 in the social networking application 504 as described above in connection with FIG. 5 to initiate the third-party application specifically related to the third-party service provider (e.g., an application developed and released by the third-party service provider) to complete the purchase transaction and receive a confirmation message from the third-party service provider through the social networking application 504. Note that this example is for illustrative purposes. This methodology can be used for other purposes as well by treating the third-party application as a participant of a conversation with the user of the mobile device 500.

Figure 6:
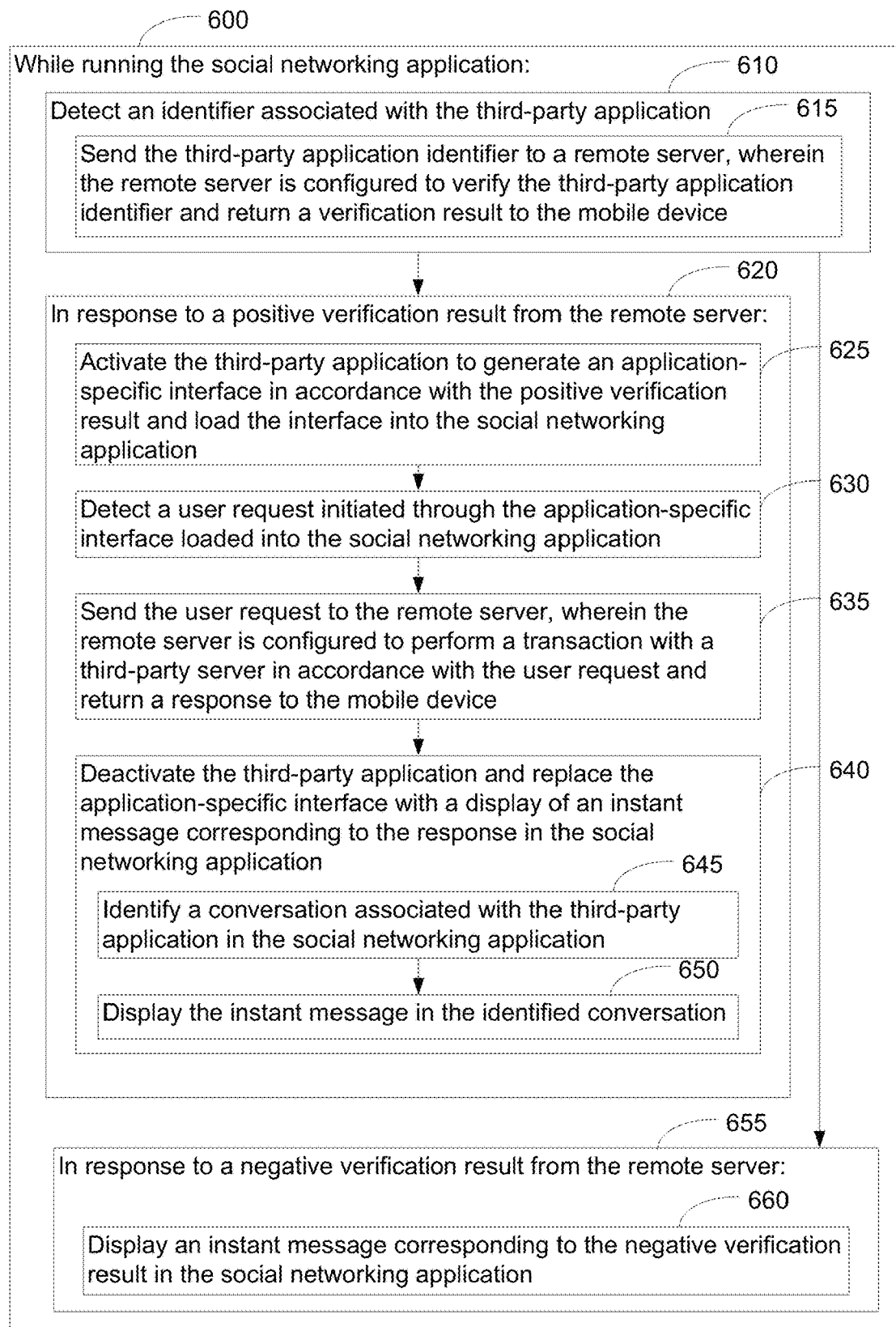
FIG. 6 is a flowchart of loading application-specific interfaces into a social networking application in connection with a resource exchange according to some embodiments of the present application.

As shown in FIG. 6, while running (600) the social networking application 504, the mobile device 500 detects (610) an identifier associated with the third-party application and sends (615) the third-party application identifier to a remote server. In some embodiments, the identifier associated with the third-party application is detected by scanning a QR code associated with the third-party application using the social networking application (e.g., the scanner module 5041). FIG. 7B depicts a QR code 725 captured by the social networking application 505. In some other embodiments, the identifier associated with the third-party application is detected by detecting a user selection of a link to the third-party application displayed in the social networking application. In some embodiments, the identifier is sent to the remote server without any further user instruction. In some other embodiments, an express user approval may be required before the transmission of the identifier.

In this example, the remote server is responsible for managing services provided through the social networking application 504. Upon receipt of the third-party application identifier, the remote server verifies the third-party application identifier and returns a verification result to the mobile device 500. For example, the remote server may send the third-party application identifier and optionally an identifier of the user of the mobile device 500 to the third-party server that is configured to support the third-party application (e.g., an application that collects fees from purchasers of a publication). The third-party server interprets the third-party application identifier and determines one or more parameters associated with the third-party application identifier required for performing the transaction with the third-party server. For example, the third-party server determines the location of the newsstand that has the QR code, the identity of the publication to be purchased by the user of the mobile device 500, and the cost of the publication. Based on the interpretation of the identifier, the third-party server generates a response including the parameters and returns the response to the remote server. In some embodiments, the parameters are encrypted by the third-party server such that only the third-party application at the mobile device 500 is able to decrypt the parameters and generate an application-specific interface using the parameters. This security measure is to make sure that the confidential information specific to the third-party application is not inadvertently exposed to others through the social networking application.

The verification at the remote server may have two possible outcomes, positive or negative. A positive verification result indicates that the user of the mobile device 500 is allowed to continue the transaction with the third-party server through the social networking application. In response to a positive verification result (620), the mobile device 500 (or more specifically, the social networking application 504) activates (625) the third-party application 505 to generate an application-specific interface in accordance with the positive verification result and load the interface into the social networking application 505. FIG. 7C depicts an application-specific interface 730 that is associated with the third-party application called "ABC-Specific App". At this time, the third-party application 505 starts operating inside the social networking application 504 while the social networking application 504 is still actively running. But as noted above, the application-specific interface 730 is not only easier to be loaded into the social networking application and but also more secure than a web page based approach. Through this application-specific interface, the user can update those application-specific parameters such as product name, number of units, and total cost of the purchase before clicking the submit button 735.

Upon detecting (630) a user request initiated through the application-specific interface loaded into the social networking application (e.g., a user click of the submit button 735), the social networking application 504 sends (635) the user request to the remote server. In some embodiments, although the user request was initiated from the third-party application 505, it was not directly submitted to the third-party server. Rather, the user request is submitted to the remote server associated with the social networking application 504, e.g., through the third-party application interface module 5042. In some embodiments, the current location of the mobile device 500 (e.g., as determined by the GPS module 506) is also provided by the mobile device 500 along with the user request. Such location information may be used by the remote server or the third-party server to determine the location of such transaction so that the service provider can tell the effectiveness of the QR codes at different locations.

In response, the remote server performs a transaction with the third-party server in accordance with the user request and returns a response to the mobile device. In some embodiments, the remote server needs to provide the user account information 5052 to the third-party server to complete the transaction. In some embodiments, the user account information 5052 may be the same or related to the user account information of the social networking application 504. For example, a user that has logged into his/her account of the social networking application 504 is allowed to access his/her account of the third-party application 505 using the same user account information.

Figure 7E:
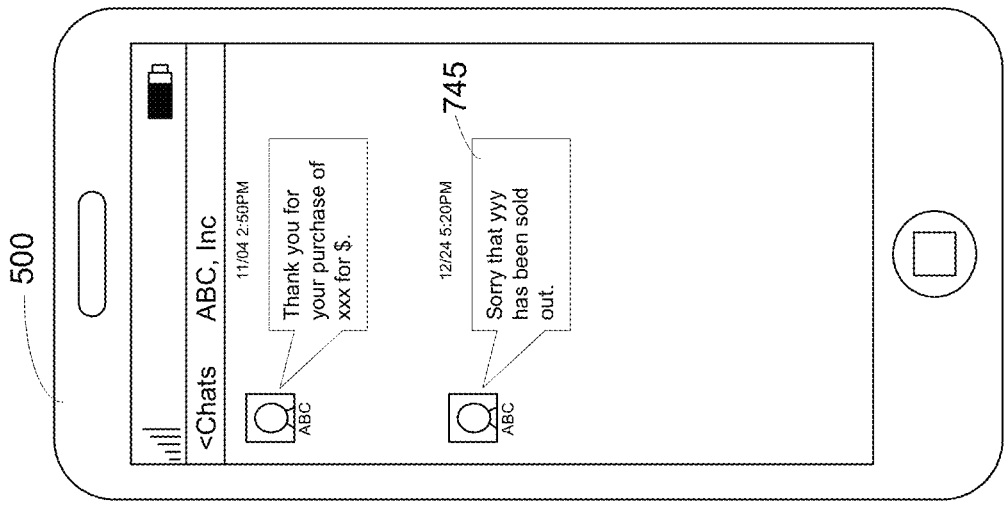
Figure 7D:
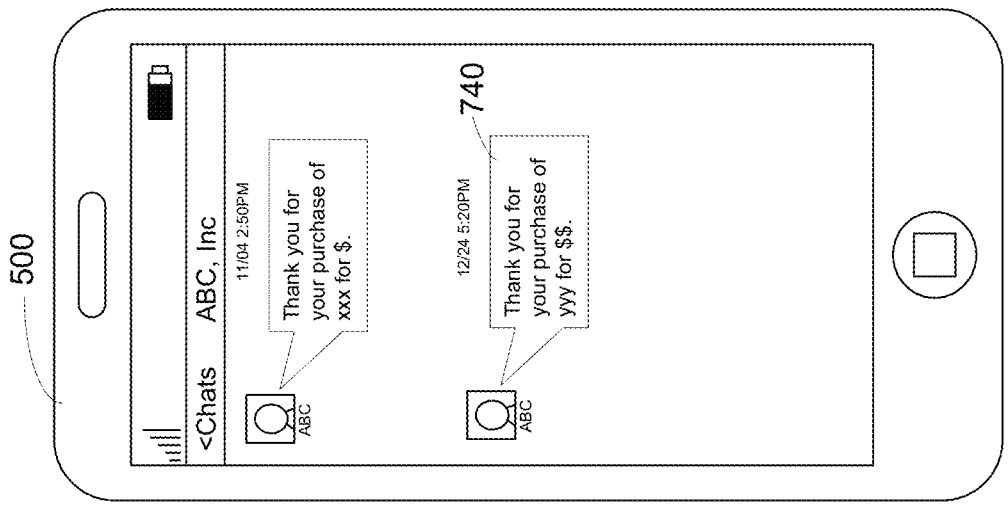

Upon receipt of the transaction response from the remote server, the mobile device 500 (or more specifically, the social networking application 504) deactivates (640) the third-party application 505 and replaces the application-specific interface with a display of an instant message corresponding to the response in the social networking application 504. In some embodiments, the social networking application 504 identifies (645) a conversation associated with the third-party application 505 in the social networking application 504 and displays (650) the instant message in the identified conversation. FIG. 7D depicts an updated user interface of the social networking application 504. Compared with the one shown in FIG. 7A, a new instant message 740 is added to the conversation between the user and the third-party service provider "ABC, Inc.". This new message indicates that the transaction initiated by the user of the mobile device 500 has been completed successfully. By maintaining the transaction records in the form of a conversation, the social networking application 505 makes it easier for the third-party application to be integrated into the social networking application 504 without losing its own uniqueness as shown in FIG. 7C.

Finally, in response to a negative verification result (655), the mobile device 500 (or more specifically, the social networking application 504) displays (660) an instant message corresponding to the negative verification result in the social networking application 504. A negative verification result may be that the user of the mobile device 500 does not have enough resource to complete the transaction or that the third-party server may stop supporting such transactions. FIG. 7E depicts a user interface of the social networking application 504 including a message 745 corresponding to a negative verification result. Note that the integration of the third-party application 505 into the social networking application 504 and the interaction therebetween offer many benefits to users of both applications that the conventional approach cannot provide.

In conclusion, the foregoing is merely preferred embodiments of the present application, and is not intended to limit the protection scope of the present application. Any modification, equivalent replacement, or improvement made without departing from the spirit and principle of the present application shall fall within the protection scope of the present application.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of loading interfaces of a third-party application into a social networking application, comprising:
   at a mobile device having one or more processors and memory for storing programs to be executed by the one or more processors:
      while running the social networking application:
         detecting an identifier associated with the third-party application;
         sending the third-party application identifier to a remote server to verify whether a user of the mobile device is allowed to continue a transaction with a third-party server through the social networking application;
         upon reception from the remote server of a verification result indicating that the user of the mobile device is allowed to continue the transaction with the third-party server through the social networking application:
            activating the third-party application to generate an application-specific interface that is associated with the third-party application and loading the interface into the social networking application, the application-specific interface comprising a first field indicating a number of units, a second field indicating a transaction cost and a submit button;
            changing the number of units indicated in the first field based on a user input corresponding to the first field being detected;
            detecting a user request of performing the transaction with the third-party server based on a selection of the submit button through the application-specific interface loaded into the social networking application;

sending the user request to the remote server; and upon reception of a response of the transaction from the remote server, deactivating the third-party application and directly displaying the response in the social networking application in a form of an instant message.

2. The method of claim 1, comprising:

upon reception from the remote server of a verification result indicating that the user of the mobile device is not allowed to continue the transaction with the third-party server through the social networking application:

displaying a corresponding instant message in the social networking application.

3. The method of claim 1, wherein directly display the response in the social networking application in a form of an instant message further comprises:

identifying a conversation associated with the third-party application in the social networking application; and displaying the instant message in the identified conversation.

4. The method of claim 1, wherein the identifier associated with the third-party application is detected by scanning a QR code associated with the third-party application using the social networking application.

5. The method of claim 1, wherein the identifier associated with the third-party application is detected by detecting a user selection of a link to the third-party application displayed in the social networking application.

6. The method of claim 1, wherein verifying whether a user of the mobile device is allowed to continue a transaction with a third-party server through the social networking application comprises:

sending the third-party application identifier to the third-party server;

receiving a response from the third-party server, the response including one or more parameters required for performing the transaction with the third-party server; and generating the verification result using the one or more parameters.

7. The method of claim 6, wherein the one or more parameters are encrypted by the third-party server such that only the third-party application at the mobile device is able to decrypt the one or more parameters and generate the interface using the one or more parameters.

8. The method of claim 1, wherein the application-specific interface further comprises a third field indicating a product name associated with the third-party application identifier.

9. The method of claim 8, wherein the user request sent to the remote server includes the product name, the number of units corresponding to the transaction and a location of the mobile device.

10. The method of claim 9, wherein the instant message indicates whether the transaction has been successfully completed.

11. A mobile device, comprising:
one or more processors;
memory; and
one or more program modules stored in the memory, wherein the one or more program modules include instructions to be executed by the one or more processors, the instructions further including:
while running a social networking application:
detecting an identifier associated with a third-party application;

sending the third-party application identifier to a remote server to verify whether a user of the mobile device is allowed to continue a transaction with a third-party server through the social networking application;

upon reception from the remote server of a verification result indicating that the user of the mobile device is allowed to continue the transaction with the third-party server through the social networking application:

activating the third-party application to generate an application-specific interface that is associated with the third-party application and loading the interface into the social networking application, the application-specific interface comprising a first field indicating a number of units, a second field indicating a transaction cost and a submit button;

changing the number of units indicated in the first field based on a user input corresponding to the first field being detected;

detecting a user request of performing the transaction with the third-party server based on a selection of the submit button through the application-specific interface loaded into the social networking application;

sending the user request to the remote server; and upon reception of a response of the transaction from the remote server, deactivating the third-party application and directly displaying the response in the social networking application in a form of an instant message.

12. The mobile device of claim 11, wherein the instructions further include:

upon reception from the remote server of a verification result indicating that the user of the mobile device is not allowed to continue the transaction with the third-party server through the social networking application:

displaying a corresponding instant message in the social networking application.

13. The mobile device of claim 11, wherein the identifier associated with the third-party application is detected by scanning a QR code associated with the third-party application using the social networking application.

14. The mobile device of claim 11, wherein the identifier associated with the third-party application is detected by detecting a user selection of a link to the third-party application displayed in the social networking application.

15. The mobile device of claim 11, wherein the instructions for directly display the response in the social networking application in a form of an instant message further comprises instructions for:

identifying a conversation associated with the third-party application in the social networking application;

displaying the instant message in the identified conversation.

16. A non-transitory computer readable storage medium storing one or more program modules, the one or more program modules comprising instructions, which, when executed by one or more processors of a mobile device, cause the processors to perform operations including:

while running a social networking application:
detecting an identifier associated with a third-party application;
sending the third-party application identifier to a remote server to verify whether a user of the mobile device is allowed to continue a transaction with a third-party server through the social networking application;

upon reception from the remote server of a verification result indicating that the user of the mobile device is allowed to continue the transaction with the third-party server through the social networking application:

activating the third-party application to generate an application-specific interface that is associated with the third-party application and loading the interface into the social networking application, the application-specific interface comprising a first field indicating a number of units, a second field indicating a transaction cost and a submit button;

changing the number of units indicated in the first field based on a user input corresponding to the first field being detected;

detecting a user request of performing the transaction with the third-party server based on a selection of the submit button through the application-specific interface loaded into the social networking application;

sending the user request to the remote server; and upon reception of a response of the transaction from the remote server, deactivating the third-party application and directly displaying the response in the social networking application in a form of an instant message.

17. The non-transitory computer readable storage medium of claim 16, wherein the operations further include:

upon reception from the remote server of a verification result indicating that the user of the mobile device is not allowed to continue the transaction with the third-party server through the social networking application:

displaying a corresponding instant message in the social networking application.

18. The non-transitory computer readable storage medium of claim 16, wherein the identifier associated with the third-party application is detected by scanning a QR code associated with the third-party application using the social networking application.

19. The non-transitory computer readable storage medium of claim 16, wherein the identifier associated with the third-party application is detected by detecting a user selection of a link to the third-party application displayed in the social networking application.

20. The non-transitory computer readable storage medium of claim 16, wherein the instructions for wherein directly display the response in the social networking application in a form of an instant message further comprises instructions for:

identifying a conversation associated with the third-party application in the social networking application;

displaying the instant message in the identified conversation.

* * * * *